United States Patent
Berberoglu et al.

(10) Patent No.: US 9,475,444 B2
(45) Date of Patent: Oct. 25, 2016

(54) ROOF MODULE FOR A VEHICLE ROOF OF A PASSENGER VEHICLE

(71) Applicant: Daimler AG, Stuttgart (DE)

(72) Inventors: Oguz Berberoglu, Stuttgart (DE);
Achim Demmer, Magstadt (DE);
Stefan Doeffinger, Weil der Stadt (DE);
Peer-Olaf Kober, Grafenau (DE);
Juergen Schrader, Weil im Schoenbuch (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/652,250

(22) PCT Filed: Oct. 25, 2013

(86) PCT No.: PCT/EP2013/003221
§ 371 (c)(1),
(2) Date: Jun. 15, 2015

(87) PCT Pub. No.: WO2014/090354
PCT Pub. Date: Jun. 19, 2014

(65) Prior Publication Data
US 2015/0343979 A1  Dec. 3, 2015

(30) Foreign Application Priority Data
Dec. 15, 2012 (DE) .................. 10 2012 024 566

(51) Int. Cl.
*B60J 7/00* (2006.01)
*B60R 21/04* (2006.01)
(Continued)

(52) U.S. Cl.
CPC ............... *B60R 21/04* (2013.01); *B60J 7/02* (2013.01); *B60J 7/043* (2013.01); *B60R 13/0231* (2013.01); *B62D 25/06* (2013.01); *B62D 29/008* (2013.01); *B60R 2021/0442* (2013.01)

(58) Field of Classification Search
CPC .............................................. B60J 7/00–7/068
USPC ..................................... 296/216.01–224, 214
See application file for complete search history.

(56) References Cited

U.S. PATENT DOCUMENTS 4,293,161 A * 10/1981 Lutz ..................... B60J 7/003
296/213
4,671,565 A * 6/1987 Grimm .................... B60J 7/057
296/213
(Continued)

FOREIGN PATENT DOCUMENTS

CN 101293504 A 10/2008
CN 103419608 A 12/2013
(Continued)

OTHER PUBLICATIONS

PCT/EP2013/003221, International Search Report dated Jan. 30, 2014, with partial English translation (Six (6) pages).
(Continued)

*Primary Examiner* — Dennis H Pedder
(74) *Attorney, Agent, or Firm* — Crowell & Moring LLP

(57) ABSTRACT

A roof module for a vehicle roof of a passenger vehicle is disclosed. The roof module has at least one covering element which is adjustable in a guided manner along lateral guiding elements which are spaced apart from one another in the vehicle transverse direction between a closed position which covers a roof opening and an open position which releases the roof opening at least in a partial region. At least one of the guiding elements is formed at least in an absorption region as an energy absorption element which is deformable, thereby absorbing energy, in the case of an at least indirect impact of the head of a vehicle occupant with the energy absorption element.

3 Claims, 1 Drawing Sheet

(51) Int. Cl.
  *B60J 7/043* (2006.01)
  *B62D 25/06* (2006.01)
  *B60R 13/02* (2006.01)
  *B60J 7/02* (2006.01)
  *B62D 29/00* (2006.01)

(56) References Cited

U.S. PATENT DOCUMENTS

| | | | | |
|---|---|---|---|---|
| 4,923,245 | A * | 5/1990 | Kuwabara | B60R 13/0206 24/295 |
| 5,048,890 | A * | 9/1991 | Masuda | B60J 7/05 296/216.08 |
| 6,196,625 | B1 * | 3/2001 | Nagashima | B60J 7/022 296/213 |
| 6,224,147 | B1 * | 5/2001 | Farber | B60J 7/022 296/187.04 |
| 6,343,831 | B1 * | 2/2002 | Nabert | B60J 10/12 280/751 |
| 6,409,258 | B1 * | 6/2002 | Grimm | B62D 25/06 296/210 |
| 6,454,346 | B1 * | 9/2002 | Nabuurs | B60J 7/047 296/216.03 |
| 7,036,876 | B2 * | 5/2006 | Senoo | B60R 13/0231 296/214 |
| 7,914,072 | B2 * | 3/2011 | Queener | B60J 7/022 296/210 |
| 8,118,357 | B2 * | 2/2012 | Hotta | B60J 7/0084 296/213 |
| 8,523,277 | B2 * | 9/2013 | Heo | B60J 7/02 296/213 |
| 2003/0214158 | A1 * | 11/2003 | Bohm | B60J 7/022 296/216.08 |
| 2004/0041442 | A1 * | 3/2004 | Cooney | B60J 7/022 296/216.08 |
| 2005/0225125 | A1 * | 10/2005 | Betzl | B60J 7/061 296/216.08 |
| 2008/0265622 | A1 | 10/2008 | Benkler et al. | |
| 2010/0038933 | A1 * | 2/2010 | Comfort | B60J 7/022 296/216.08 |
| 2010/0327632 | A1 * | 12/2010 | Horiuchi | B60J 7/0038 296/216.08 |
| 2012/0153685 | A1 * | 6/2012 | Heo | B60J 7/02 296/216.08 |
| 2013/0307294 | A1 | 11/2013 | Dryselius et al. | |

FOREIGN PATENT DOCUMENTS

| | | |
|---|---|---|
| DE | 10 2004 001 587 A1 * | 8/2005 |
| EP | 1 036 688 A2 | 9/2000 |
| EP | 2 664 473 A1 | 11/2013 |
| WO | WO 2008/034433 A1 | 3/2008 |

OTHER PUBLICATIONS

PCT/EP2013/003221, German-language Written Opinion dated Jan. 30, 2014 (Five (5) pages).
Chinese-language Office Action issued in counterpart Chinese Application No. 201380064903.X dated Apr. 29, 2016 with English translation (Nine (9) pages).

* cited by examiner

ROOF MODULE FOR A VEHICLE ROOF OF A PASSENGER VEHICLE

BACKGROUND AND SUMMARY OF THE INVENTION

The invention relates to a roof module for a vehicle roof of a passenger vehicle.

Such roof modules are known in a plurality of embodiments from the series vehicle production of passenger vehicles and are usually inserted between each lateral roof frame and a front and rear roof cross beam of the vehicle roof. The advantage of such roof modules is that vehicles can thus be designed with different roofs, for example sliding and/or lifting roofs, panorama roofs, simple sheet roofs or similar in a simple and cost-effective manner. The present roof module comprises a covering element in the vehicle transverse direction which is able to be adjusted in a guided manner along guiding elements which are spaced apart from one another in the vehicle transverse direction, between a closed position which covers a roof opening and at least one open position which releases the roof opening in the partial region.

It is furthermore known to provide vehicle roofs with corresponding energy absorption elements which are arranged between the shell structure of the vehicle roof and a casing element which covers this. The energy absorption elements serve to absorb energy in the case of an at least indirect impact of the head of a vehicle occupant with the energy absorption element and to protect the vehicle occupant accordingly. The use of such energy absorption elements is, however, connected to very high costs and a higher weight of the vehicle roofs.

It is therefore the object of the present invention to create a roof module which enables advantageous accident performance in a cost and weight-efficient manner.

In order to create a roof module which enables particularly advantageous accident performance in a cost and weight-efficient manner, it is provided according to the invention that at least one of the guiding elements is formed as an energy absorption element at least in an absorption region, the energy absorption element being deformable, thereby absorbing energy, in the case of an at least indirect impact of the head of a vehicle occupant with the energy absorption element. An absorption function is thus integrated into the at least one guiding element such that the at least one guiding element has a double function. On the one hand, the at least one guiding element thus serves to guide the covering element such that it can be adjusted between the closed position and the open position in a manner that is defined and free of jamming and flapping. On the other hand, the at least one guiding element also serves, however, to convert this accident energy into deformation energy by deforming during force loading caused by an accident and an at least indirect impact of the head with the guiding element which results from this, and thus to absorb or reduce forces caused by an accident. Thus, forces which result from the force loading caused by an accident and from the impact and acting on the vehicle occupant can be kept low. Furthermore, this advantageous accident performance can be implemented in a particularly simple, cost and weight-efficient manner, as the absorbing function is integrated into the at least one guiding element and the assembly of the energy absorption element on the vehicle roof is accompanied by the assembly of the roof module on the vehicle roof at the same time. Therefore, the number of additional energy absorption elements as well as the effort for the assembly of these can be avoided or kept to a particularly low level.

The roof element which is able to be adjusted along this in a guided manner by means of the guiding elements is, for example, an inherently rigid covering element of a sliding and/or lifting roof of the roof module. The sliding and/or lifting roof is, for example, formed as an outwardly running sliding roof or as a slide and lift roof (SHD).

The guiding elements can alternatively or additionally also serve to guide a sun protection element as the roof element, wherein the sun protection element is, for example, a surface element of a blind. The roof opening in the closed position is covered at least in the partial region by means of the flexible surface element, such that an incursion of sunlight via the roof opening into the interior is reduced compared to the open position.

It has been shown to be particularly advantageous if the at least one guiding element has an open hollow cross-section in the absorption region. Thus, the absorption region can deform particularly well during force introduction as a consequence of the at least indirect impact of the head and thus can absorb and/or reduce forces caused by an accident.

For the implementation of a particularly advantageous absorption function, at least one rib and/or at least one channel and/or a corresponding cross-section is provided in the absorption region for energy absorption.

A further embodiment is distinguished in that the at least one guiding element is formed at least in the absorption region from a light metal or a light metal alloy, in particular from aluminum or from an aluminum alloy. The at least one guiding element therefore has very good ductility in the absorption region and thus very good deformability, such that impact energy is able to be converted particularly effectively and efficiently into deformation energy.

Further advantages, features and details of the invention result from the following description of a preferred exemplary embodiment as well as by means of the drawings.

DETAILED DESCRIPTION OF THE DRAWINGS

Figure 1:
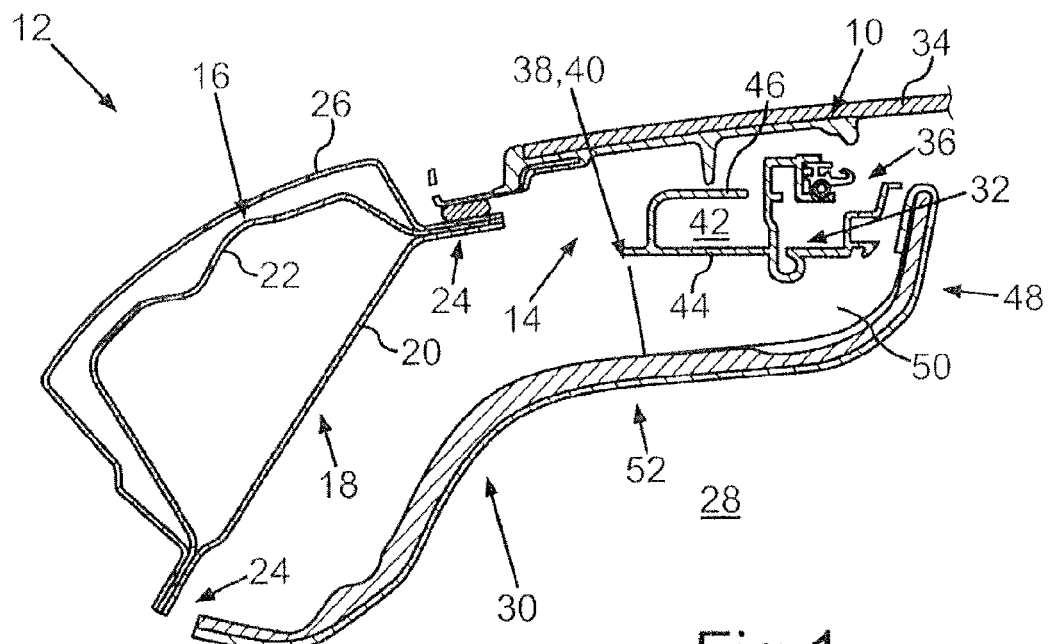
FIG. 1 is a schematic cross-sectional view through a roof module for a vehicle roof of a passenger vehicle, having lateral guiding elements which are spaced apart from one another in the vehicle transverse direction and having at least one covering element, wherein at least one of the guiding elements is formed at least in one absorption region as an energy absorption element which is deformable, thereby absorbing energy, in the case of an at least indirect impact of the head of a vehicle occupant with the energy absorption element.

FIG. 1 shows a roof module 10 for a vehicle roof 12 of a passenger vehicle in a schematic cross-sectional view. The vehicle roof 12 has a roof opening 14 which is limited in the vehicle transverse direction by respective lateral roof frames 16 of a shell structure 18 of the vehicle roof 12. The lateral roof frames 16 each comprise an inner part 20 and an outer part 22 which are connected to each other via respective joining flanges 24. Additionally, a side wall 26 can be recognized in FIG. 1, by means of which the roof frame 16 is cased outwardly. In order to case the shell structure 18 towards the interior 28 of the passenger vehicle, a casing element 30 is provided, The roof module 10 is inserted at least partially into the roof opening 14 and comprises two lateral guiding elements which are spaced apart from each other in the vehicle transverse direction in the form of guide rails 32, as well as a covering element present in the form of a covering element 34 which is formed presently as a glass cover and is thus transparent. The covering element 34 can be adjusted in a guided manner along the lateral guide rails 32 between a closed position which covers the roof opening 14 at least in a partial region and an open position which releases the roof opening 14 in the partial region. Presently, the covering element 34 and the guide rails 32 are allocated to the outwardly running sliding roof (ASD).

Figure 2:
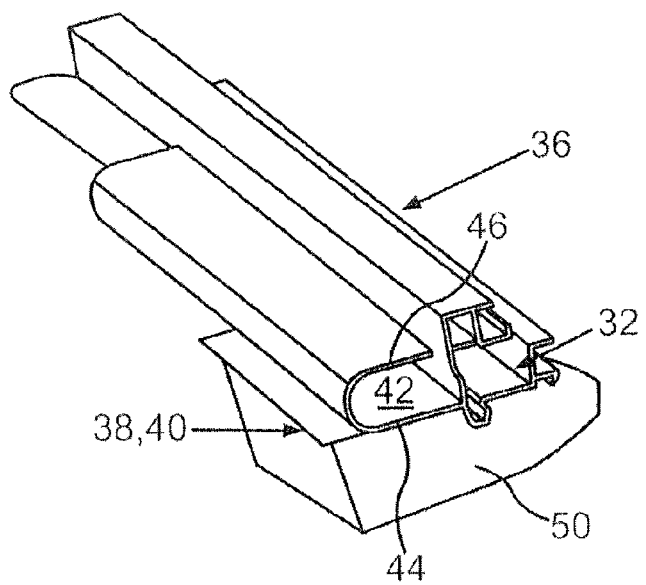
FIG. 2 is a schematic and cut perspective view onto the at least one guiding element.

As can be seen when viewed in conjunction with FIG. 2, the respective guide rails 32 have a guiding region 36 in which at least one guiding channel is provided. This guiding channel serves here to guide the covering element 34 during the adjustment thereof. In other words, the covering element 34 is pushed between the open position and the closed position in the respective guiding channel. For example, at least one further guide, for example in the form of a guiding channel, can also be provided respectively in the respective guiding region 36 of the respective guide rail 32, along which, for example, a sun protection element, for example, a flexible surface element of a blind, is able to be moved in a guided manner.

In order to achieve particularly advantageous accident performance of the vehicle roof 12 in a particularly cost and weight-efficient manner, the respective guide rail 32 (guiding element) is formed as an energy absorption element 40 in an absorption region 38 at least over a partial region of its longitudinal extension, the energy absorption element 40 being deformable, thereby absorbing energy during an at least indirect impact of the head of a vehicle occupant with the energy absorption element 40. The respective guide rail 32 thus has a double function, as, on the one hand, it is used to guide the covering element 34, and, on the other hand, it is used to absorb and/or reduce impact energy.

Here, the absorption region 38 and the guiding region 36 are formed in one piece with each other, wherein at least one additional cross-section 42 is provided in the absorption region 38 to absorb forces caused by an accident. As can be seen in particular from FIG. 1, the cross-section 42 is formed as an open hollow cross-section which is able to deform particularly well and thus can convert impact energy particularly well into deformation energy.

The absorption region 38 is connected to the guiding region 36 of the guide rail 32 outwardly in the vehicle transverse direction, wherein the absorption region 38 projects outwardly from the guiding region 36 in the vehicle transverse direction. Corresponding walls 44, 46 which at least partially limit the open hollow cross-section (cross-section 42) are provided in the absorption region which project from the guiding region 36 in the vehicle transverse direction. In the case of a corresponding force loading caused by an accident, a displacement of the head of the vehicle occupant caused by an accident occurs, whereby the head impacts with the guide rail 32 at least indirectly in the absorption region 38. A lever arm concept is thus created by the walls 44, 46, via which a force introduction into the respective guide rail 32 can occur. Due to the design of the cross-section 42 as an open hollow cross-section, the absorption region 38 can avoid and give way to the force introduction and be deformed very well in order to reduce the forces caused by an accident. Thus, a lever arm concept which is optimized in terms of head impact is created.

If the head strikes the casing element 30 in a strike region 52 and, via this, the absorption region 38, then the wall 44 acts as a support surface, and the support surface and the energy absorption element 40 brake the head in good time and in an energy-absorbing manner. The guide rail 32 thus offers the additional support surface for an impact in the strike region 52 and energy absorption occurs using the energy absorption element 40.

If the head strikes the casing element 30 in the strike region 48 and over the guide rail 32, then the guide rail and in particular the guiding region 36 can slip upwards over the long lever arm provided by the wall 44. Energy absorption thus occurs using the lever arm which deforms and is provided by the wall 44. The guide rail 32 thus acts in an energy-absorbing manner via the lever arm during an impact in the strike region 48.

As can furthermore been seen from FIGS. 1 and 2, a respective absorption element 50 is provided in the vehicle vertical direction underneath the respective guide rail 32 towards the interior 28, the absorption element 50 being arranged between the guide rail 32 and the casing element 30. As a consequence of the displacement of the head caused by an accident, this comes into supporting contact with the absorption element 50 via the casing element 30 and via this into supporting contact with the absorption region 38. The absorption element 50 is thereby deformed and thus additionally converts impact energy into deformation energy. This leads to particularly good protection of the vehicle occupant.

Preferably, the absorption region 38 and the guiding region 36 which is formed in one piece with this are formed from aluminum or an aluminum alloy, whereby the absorption region 38 in particular has very good deformability when interacting with the open hollow cross-section.

Due to the integration of the depicted absorption function into the respective guide rail 32, the costs, the weight and the effort to implement the advantageous accident performance can be kept low, since the assembly of the energy absorption element 40 is accompanied by the assembly of the roof module 10. Time-consuming and expensive additional assembly steps can be avoided. Additionally, due to the integration, particularly effective energy absorption is able to be implemented in only a very small space such that a space gain can be achieved for the specified outer dimensions of the passenger vehicle.

The invention claimed is:

1. A roof module for a vehicle roof of a passenger vehicle, comprising:
    a covering element, wherein the covering element is adjustable in a guided manner along lateral guiding elements which are spaced apart from one another in a vehicle transverse direction between a closed position which covers a roof opening and an open position which releases the roof opening at least in a partial region;
    wherein at least one of the guiding elements is formed with a guiding region, in which at least one guiding channel is provided, and an absorption region as an energy absorption element, disposed outwardly of the guiding region, which is deformable such that energy is absorbable in a case of an at least indirect impact of a head of a vehicle occupant with the energy absorption element;
    wherein the guiding region guides the covering element;
    wherein the absorption region has an open hollow cross-section defined by a u-shaped structure that includes a first wall and a second wall;

wherein the first wall and the second wall are disposed parallel to each other and parallel to a strike region of a casing element which is disposed above a head of an occupant of the passenger vehicle and are disposed a distance apart from each other;

wherein the u-shaped structure extends outwardly from and opens inwardly toward the guiding region of the at least one of the guiding elements in the vehicle transverse direction; and wherein the first wall connects to the second wall only at a location between lateral inner and outer ends of the first wall, and only the first wall is connected to the guiding region such that the first wall forms a lever arm with respect to the guiding region.

2. The roof module according to claim 1, wherein the at least one of the guiding elements is formed at least in the absorption region from a light metal.

3. The roof module according to claim 2, wherein the light metal is aluminum.

* * * * *